United States Patent
Ide et al.

(10) Patent No.: US 7,346,441 B2
(45) Date of Patent: Mar. 18, 2008

(54) LOADING SYSTEM FOR VEHICLE PASSENGER PROTECTION DEVICE

(75) Inventors: Seiya Ide, Okazaki (JP); Yoshihisa Ogata, Chiryu (JP)

(73) Assignee: DENSO CORPORATION, Kariya (JP)

( * ) Notice: Subject to any disclaimer, the term of this patent is extended or adjusted under 35 U.S.C. 154(b) by 628 days.

(21) Appl. No.: 10/827,243

(22) Filed: Apr. 20, 2004

(65) Prior Publication Data
US 2004/0210368 A1    Oct. 21, 2004

(30) Foreign Application Priority Data
Apr. 21, 2003 (JP) .............................. 2003-115824

(51) Int. Cl.
*B60R 21/32* (2006.01)
(52) U.S. Cl. .................. 701/45; 180/282; 280/735
(58) Field of Classification Search ............... 701/29, 701/36, 45–48; 280/728.1, 734–735; 307/9.1, 307/10.1; 180/282
See application file for complete search history.

(56) References Cited

U.S. PATENT DOCUMENTS 5,406,127 A * 4/1995 Furui et al. ................ 307/10.1
5,677,838 A * 10/1997 Itou et al. ..................... 701/29

2004/0007860 A1   1/2004 Miyata et al.

FOREIGN PATENT DOCUMENTS

| JP | A-04-176757 | 6/1992 |
| JP | A-07-304413 | 11/1995 |
| JP | A-H07-304414 | 11/1995 |
| JP | A-2003-2160 | 1/2003 |
| WO | WO 01/068416 | 9/2001 |
| WO | WO 01/068416 | 9/2001 |

OTHER PUBLICATIONS

Notice of Rejection dated Aug. 24, 2007 in corresponding Japanese Patent Application No. 2003-115824 (and English translation).

* cited by examiner

*Primary Examiner*—Yonel Beaulieu
(74) *Attorney, Agent, or Firm*—Posz Law Group, PLC

(57) ABSTRACT

A loading system for a vehicle passenger protection device performs collision determination without using inaccurate signals included among acceleration signals input to a collision determination unit. First and second normal/abnormal judgment units judge whether output signals from a main G sensor and a satellite G sensor are normal signals or abnormal signals. If abnormal, then abnormal signal processing is performed to replace the abnormal signal value with the output value of an immediately preceding normal signal, to thereby produce an abnormal signal processing signal. Segment integration is then performed on the normal signals and the abnormal signal processing signal(s) to determine whether the vehicle has collided.

15 Claims, 3 Drawing Sheets

LOADING SYSTEM FOR VEHICLE PASSENGER PROTECTION DEVICE

CROSS REFERENCE TO RELATED APPLICATIONS

This application is based upon, claims the benefit of priority of, and incorporates by reference Japanese Patent Application No. 2003-115824 filed Apr. 21, 2003.

BACKGROUND OF THE INVENTION

1. Field of the Invention

The present invention relates to an airbag device.

2. Description of the Related Art

Conventionally, an output signal from an acceleration sensor is output through a clipper or low pass filter, and the signal from the clipper or low pass filter is used to determine whether a vehicle collision has occurred (see Japanese Patent Laid-Open Publication No. Hei 7-304414).

Here, when the acceleration sensor is mounted inside an ECU containing a CPU for performing vehicle collision determination, virtually no noise or other influences occur as a result of communications from the acceleration sensor to the CPU. Therefore, the acceleration input from the acceleration sensor into the CPU does not drift significantly from the actual acceleration.

However, in recent years, satellite sensors and other acceleration sensors arranged outside the ECU are being used to make collision determinations. Noise and other influences occurring along the communications line during the communications from the satellite sensor to the CPU can cause the acceleration input from the acceleration sensor to the CPU to drift away from the actual acceleration. Thus, calculations performed for the collision determination based on this imprecise acceleration become inaccurate, creating a possibility of an airbag malfunction.

SUMMARY OF THE INVENTION

The present invention has been made in light of the aforementioned issues, and it is therefore an object of this invention to provide a loading system for a vehicle passenger protection device capable of performing a collision determination without using inaccurate acceleration signals included among acceleration signals input into a CPU. In order to resolve the above-mentioned problems, through diligent research and trial-and-error the inventors of the present invention conceived of performing a judgment of normalcy/abnormalcy with respect to the acceleration signals input into the CPU before performing the determination as to whether a collision has occurred, and thus the inventors completed the present invention.

Namely, a loading system for a vehicle passenger protection device in accordance with the present invention includes an acceleration sensor; collision determination means; and loading means. Here, the acceleration sensor is a sensor for detecting acceleration of a vehicle. The collision determination means is means for performing a determination as to whether or not the vehicle has collided based on an output signal from the acceleration sensor, and outputting an airbag release signal (which is a release signal for an airbag) in a case where the collision determination means determines that the vehicle has collided. As just an example, the collision determination means may be constructed with segment integrating means and release signal outputting means. The segment integrating means is means for calculating a segment integration value obtained by performing segment integration of output values from the acceleration sensor during a predetermined duration of time. The release signal outputting means is means for outputting the airbag release signal (which is the release signal for the airbag) in a case where the segment integration value exceeds a collision determination threshold value. Note that when the segment integration value has exceeded the collision determination threshold value, this indicates that the vehicle has had a collision. The loading means is means for igniting a squib by means of electrical power from a battery or backup power source to release and load an airbag in a case where the airbag release signal has been output.

A system according to the present invention is further characterized in that it includes normal/abnormal judgment means for judging whether the output signal from the acceleration sensor is a normal signal or an abnormal signal, and the collision determination means performs a determination as to whether or not the vehicle has collided based on only the normal signal(s). The processing performed by the normal/abnormal judgment means is preferably performed by the CPU which performs that collision determination. If the collision determination means is constructed using the segment integrating means and the release signal outputting means as described above, the segment integrating means calculates the segment integration value obtained by performing segment integration using only the output values of the normal signals within the predetermined duration of time.

In other words, the determination of whether or not the vehicle has collided is performed using only the normal signals among the signal input from the acceleration sensor to the CPU. For example, in the case where segment integration is used to perform the collision determination, only the normal signals in the signals input from the acceleration sensor to the CPU are used in the segment integration to perform the collision determination. Therefore, the collision determination can be performed accurately since the collision determination is thus performed without using values that have drifted significantly from the actual acceleration due to noise and the like (i.e., without using abnormal signals). In other words, the outputting of an erroneous airbag release signal can be prevented.

Furthermore, the loading system for a vehicle passenger protection device in accordance with the present invention includes the acceleration sensor, the collision determination means, and the loading means, which are described above. As described above, the collision determination means maybe constructed with the segment integrating means and the release signal outputting means. The present invention is further characterized in that it includes normal/abnormal judgment means and abnormal signal processing means, and the collision determination means performs the determination as to whether or not the vehicle has collided based on the normal signals and an abnormal signal processing signal. Here, the normal/abnormal judgment means is a means for judging whether the output signal from the acceleration sensor is a normal signal or an abnormal signal. The abnormal signal processing means is a means for performing specific abnormal signal processing on the abnormal signals to generate an abnormal signal processing signal. If the collision determination means is constructed using the segment integrating means and the release signal outputting means as mentioned above, the segment integrating means calculates the segment integration value obtained by performing segment integration of the output values of the normal signals and the output values of the abnormal signal processing signal(s) during a predetermined duration of time.

In other words, the normal signals from among the signals input from the acceleration sensor to the CPU, and the abnormal signal processing signal(s), are used to perform segment integration before performing the collision determination. The normal signals among the signals input from the acceleration sensor into the CPU, and the abnormal signal processing signal(s), are used to determine whether or not the vehicle has had a collision. For example, in the case where the collision determination is performed using the segment integration, the normal signals among the signals input from the acceleration sensor into the CPU, and the abnormal signal processing signal(s), are used in the segment integration to perform the collision determination. Therefore, the collision determination is performed without using values which have drifted significantly from the actual acceleration due to the influence of noise and the like (i.e., without using abnormal signals), and this enables an accurate collision determination. In other words, the outputting of an erroneous airbag release signal can be prevented.

Note that the abnormal signal processing means may also include immediately preceding normal signal storing means, and abnormal signal processing signal setting means. The immediately preceding normal signal storing means is means for storing an immediately preceding normal signal output value, which is the output value of the normal signal immediately preceding the abnormal signal. The abnormal signal processing signal setting means is means for setting the value of the abnormal signal processing signal to the immediately preceding normal signal output value.

Here, the output value of the abnormal signal is usually a value proximate to the output value of the immediately preceding normal signal. Therefore, the value of the abnormal signal is changed to the output value of the immediately preceding normal signal, and the segment integration is performed using the immediately preceding normal signal output value and the output value of the normal signal. Accordingly, abnormal signals are essentially removed before performing the collision determination, whereby allowing the collision determination to be performed accurately.

Furthermore, the abnormal signal processing means may also set the value of the abnormal signal processing signal to zero. In this type of configuration, the normal signals and the abnormal signal processing signal equal to zero are used to determine whether or not the vehicle has collided. For example, in the case where the segment integration is used to perform the collision determination, the segment integration is performed based on the normal signals and the abnormal signal processing signal which is equal to zero. Therefore, the abnormal signals are eliminated before performing the collision determination, whereby enabling the collision determination to be performed accurately.

Further, the normal/abnormal judgment means may also include a change amount calculating means, and a comparative judging means. The change amount calculating means is a means for calculating an output value change amount, which is an amount of change exhibited by the output value of the output signal from the acceleration sensor, during a predetermined duration of time. The comparative judging means compares the output value change amount and a normal/abnormal determination threshold value, and if the output value change amount exceeds the normal/abnormal determination threshold value then the comparative judging means judges that the output signal from the acceleration sensor is an abnormal signal.

In other words, by using the change amount occurring in the output value of the output signal from the acceleration sensor during the predetermined duration of time, it becomes possible to perform accurately the judgment of whether or not the output signal from the acceleration sensor is normal or abnormal. If the output signal from the acceleration sensor is normal, this is because the change amount in the output value of the output signal from the acceleration sensor during the predetermine duration of time has not exceeded the certain threshold value (i.e., the normal/abnormal determination threshold value). The change amount may correspond to the output signal from the acceleration sensor itself, or a signal output through a low pass filter. The low pass filter may be a filter furnished to the acceleration sensor, or it may be a filter furnished to the normal/abnormal judgment means, or it may be a filter arranged before the input into the normal/abnormal judgment means. Using the output signal from the acceleration sensor input through the low pass filter enables more accurate judgment using the change amount.

The normal/abnormal determination threshold value should be a specific proportion of the maximum value of the output signal from the acceleration sensor. For example, the normal/abnormal determination threshold value can be set as approximately 30% of the maximum value of the output signal from the acceleration sensor. If a secondary low pass filter is used, for example, the change amount occurring every 0.5 msec in the output value of the output signal from the acceleration sensor that is output through the secondary low pass filter will not exceed approximately 30% of the maximum value of the output signal from the acceleration sensor. Therefore, setting normal/abnormal determination threshold value as described above enables reliable determination of whether the output signal from the acceleration sensor is normal or abnormal.

The acceleration sensor may be a satellite sensor. In the case where the acceleration sensor is a satellite sensor, there is a possibility that noise and other such influences will occur along the communications line from the acceleration sensor to the CPU. Nevertheless, even if the acceleration sensor is the satellite sensor, the above-mentioned configuration reliably prevents erroneous release of the airbag.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
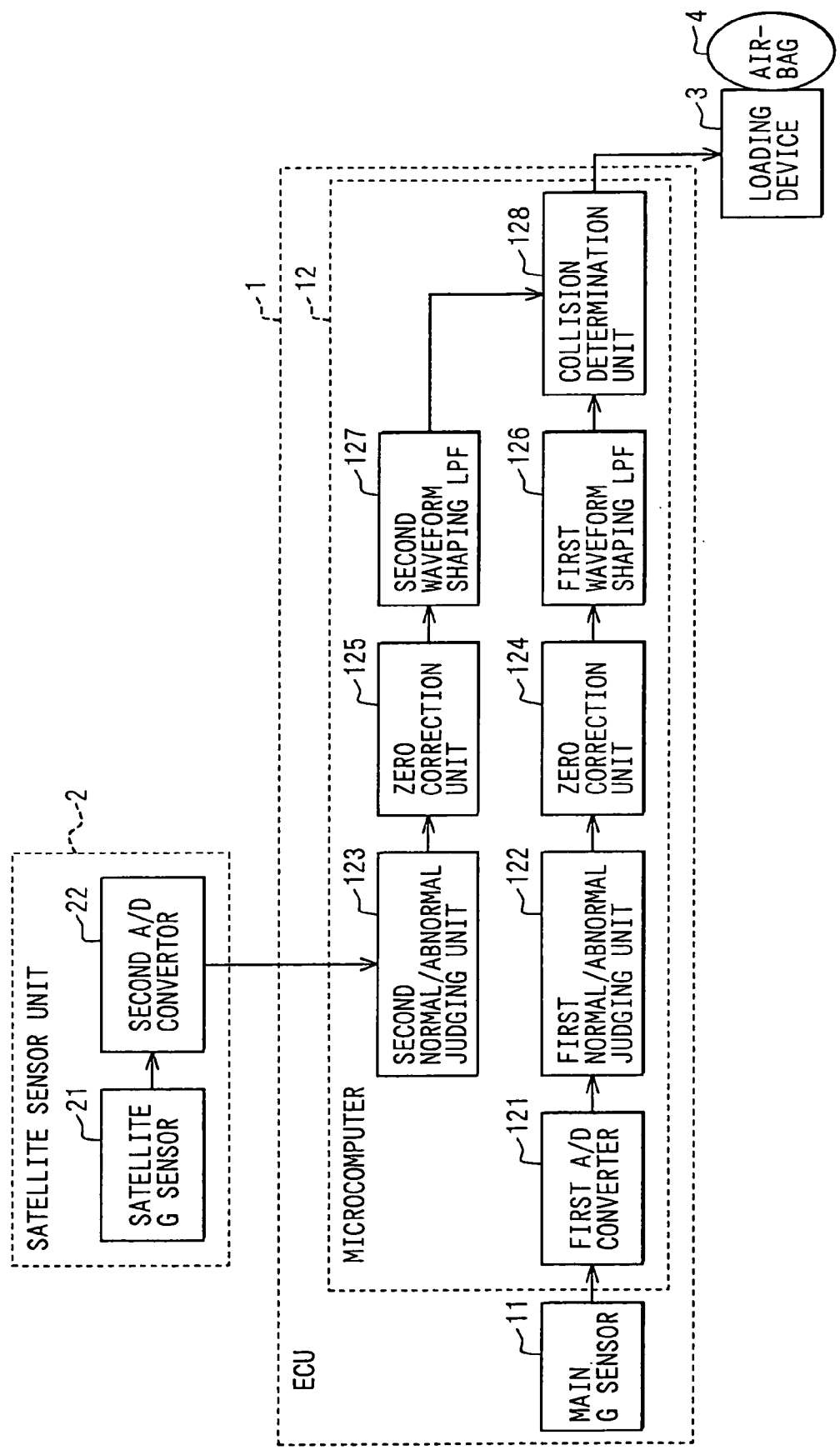
FIG. 1 is a diagram of a loading system for a vehicle passenger protection device of an embodiment of the present invention.

A loading system for a vehicle passenger protection device according to the present embodiment will now be explained with reference to FIG. 1. FIG. 1 is a diagram showing a construction of a loading system for a vehicle passenger protection device. The loading system for the vehicle passenger protection device employs an ECU 1, a satellite sensor unit 2, a loading system (loading means) 3, and an airbag 4.

A main G sensor (acceleration sensor) 11 and a microcomputer 12 constitute the ECU 11, which is arranged near the center of the vehicle. The main G sensor 11 is a sensor for detecting the acceleration of the vehicle (main acceleration). More specifically, the main G sensor 11 outputs the vehicle's acceleration (main acceleration) as an analog electrical signal (main acceleration signal) corresponding to a change amount of acceleration. Furthermore, the main G sensor 11 also includes a low pass filter (LPF). The low pass filter is a secondary low pass filter with a cutoff frequency of 175 Hz.

The microcomputer 12 is constituted of a first A/D converter 121, a first normal/abnormal judging unit (normal/abnormal judging means) 122, a second normal/abnormal judging unit (normal/abnormal judging means) 123, a first zero correction unit 124, a second zero correction unit 125, a first waveform shaping LPF 126, a second waveform shaping LPF 127, and a collision determination unit (collision determination means, segment integrating means, release signal outputting means) 128.

The first A/D converter 121 is connected to the main G sensor 11. Therefore, the first A/D converter 121 receives the acceleration signal output as an analog signal from the main G sensor 11, and then performs A/D conversion on this analog main acceleration signal to generate a digital main acceleration signal.

The first normal/abnormal judging unit 122 judges whether the digital main acceleration signal (which was produced by the first A/D converter 121) is a normal signal or an abnormal signal (i.e., referred to as "normal/abnormal judgment processing"). Then, the second normal/abnormal judging unit 123 receives a digital satellite acceleration signal output from a satellite sensor unit 2 which is explained below, and judges whether this satellite acceleration signal is normal or abnormal (i.e., "normal/abnormal judgment processing"). The normal/abnormal judgment processing is described in detail below.

The first zero correction unit 124 judges whether the zero value of the main acceleration signal output through the first normal/abnormal judging unit 122 has shifted, and corrects any shifts. The second zero correction unit 125 judges whether the zero value of the satellite acceleration signal output through the second normal/abnormal judging unit 123 has shifted, and corrects any shifts. The first and second waveform shaping LPFs (the low pass filters) 126, 127 eliminate noise, etc. included in the zero-corrected main acceleration signal and the satellite acceleration signal, thereby shaping an appropriate waveform.

The collision determination unit 128 determines whether or not the vehicle has collided (i.e., referred to as "collision determination processing") based on the main acceleration signal and the satellite acceleration signal output from the first and second waveform shaping LPFs 126, 127. Furthermore, when the collision determination unit 128 has determined that the vehicle has collided, it outputs an airbag release signal, which is a release signal for the airbag 4. On the other hand, if the collision determination unit 128 has not determined that the vehicle has collided, it does not output the airbag release signal. In the case where the collision determination unit 128 has output the airbag release signal, the loading system 3 is driven to ignite a squib by means of electrical power from a battery or a backup power supply so as to make the airbag 4 release and load.

The satellite sensor unit 2 is constituted of a satellite G sensor (acceleration sensor) 21, and a second A/D converter 22. The satellite sensor unit 2 is arranged in front of, to the side of, behind, or in some other similar relationship to the vehicle. The satellite G sensor 21 is a sensor for detecting the vehicle's acceleration (satellite acceleration). More specifically, the satellite G sensor 21 outputs the vehicle's acceleration (satellite acceleration) as an analog signal (satellite acceleration signal) corresponding to a change amount of acceleration. Furthermore, the satellite G sensor 21 includes a low pass filter (LPF) as a secondary low pass filter with a cut off frequency of 175 Hz.

The second A/D converter 22 is connected to the satellite G sensor 21. Therefore, the second A/D converter 22 receives the satellite acceleration signal output as an analog signal from the satellite G sensor 21, and performs an A/D conversion on this analogue satellite acceleration signal to produce a digital satellite acceleration signal. Then, the second A/D converter 22 outputs the digital satellite acceleration signal through a communications cable (not shown in the diagram) to the above-mentioned second normal/abnormal judging unit 123.

(Normal/Abnormal Judgment Processing)

Figure 2:
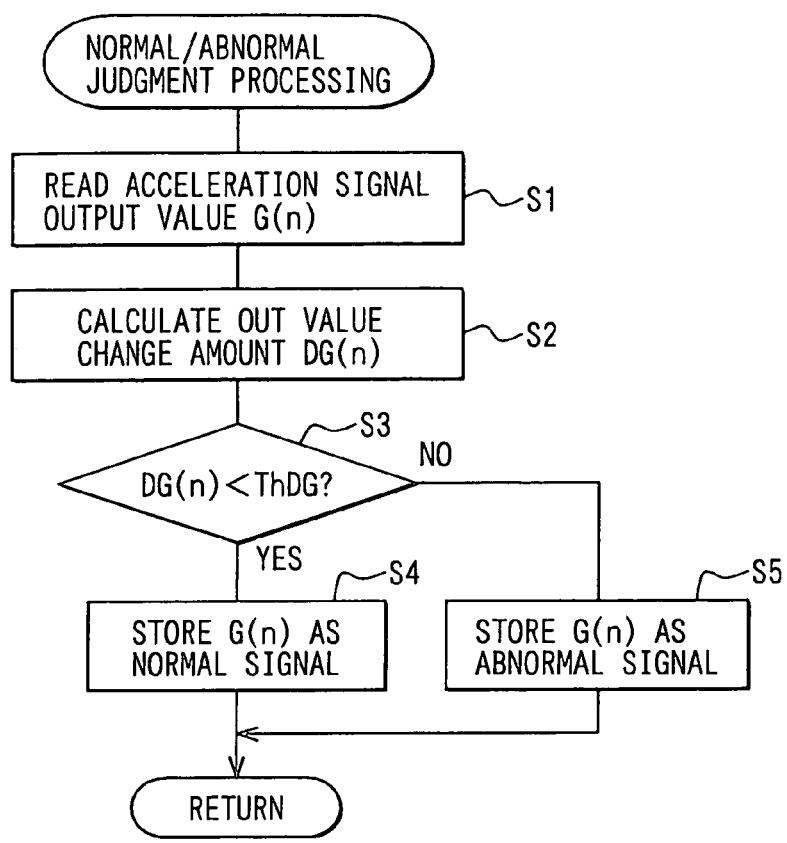
FIG. 2 is a flowchart of normal/abnormal judgment processing of an embodiment of the present invention.

Next, explanation is given regarding the normal/abnormal judgment processing, with reference to FIG. 2. FIG. 2 shows a flowchart of the normal/abnormal judgment processing. Note that the normal/abnormal judgment processing is processing performed by the first and the second normal/abnormal judging units 122, 123. However, explanation is given here with respect to the first normal/abnormal judging unit 122 only.

First, an output value G(n) of the digital main acceleration signal output from the first A/D converter 121 is read at predetermined sampling intervals T1, and these are stored (step S1). Note that G(n) indicates the output value G of the main acceleration signal at time n. Here, as an example, the predetermined sampling interval T1 is set at 0.5 msec. In other words, the main acceleration signal's output value G(n) is stored every 0.5 msec.

Next, the amount of change (hereinafter, referred to as the "output value change amount") DG(n) of the output value G(n) of the main acceleration signal at sampling interval T1 is calculated (change amount calculating means) (Step S2). More specifically, the difference between the output value G(n) of the main acceleration signal at time n and the output value G(n−1) of the main acceleration signal at time n−1 is calculated as [G(n)−G(n−1)] to obtain the output value change amount DG. Note that output value change amount DG(n) indicates the output value change amount DG at time n.

Next, the output value change amount DG(n) is compared to a pre-stored normal/abnormal determination threshold value ThDG (comparative judging means) (Step S3). This normal/abnormal determination threshold value THDG can be set at, for example, a value that is approximately 30% of the maximum value of the main acceleration signal output value G(n). A method for determining the normal/abnormal determination threshold value THDG is discussed below.

Next, if the output value change amount DG(n) is less than the normal/abnormal determination threshold value THDG, it is judged that the output value change amount DG(n) is the output value of a normal signal (comparative judging means) (step S4). On the other hand, if the output value change amount DG(n) is equal to or greater than the normal/abnormal determination threshold value ThDG, it is judged that the output value change amount DG(n) is the output value of an abnormal signal (comparative judging means) (step S5). The procedure then returns and repeats the processing.

Note that, the normal/abnormal judgment processing by the second normal/abnormal judging unit 123 is similar in all respects to the normal/abnormal judgment processing by the first normal/abnormal judging unit 122 described above, except that the main acceleration signal is replaced with the satellite acceleration signal.

(Method for Determining Normal/Abnormal Determination Threshold Value ThDG)

Figure 3:
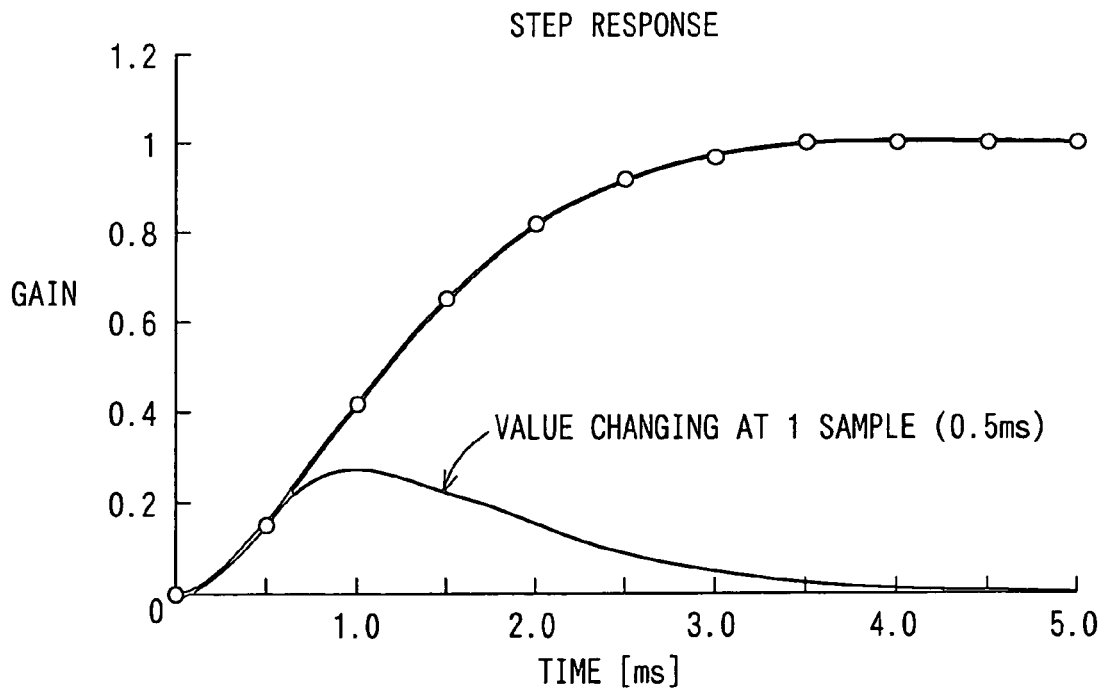
FIG. 3 is a diagram of gain of an output value of an acceleration signal at a sampling time n of an embodiment of the present invention.

Next, explanation is given regarding a method for determining the normal/abnormal determination threshold value ThDG, with reference to FIG. 3. FIG. 3 is a diagram showing gain occurring in the output value G(n) of the main acceleration signal at sampling time n. Furthermore, the bold line shown in FIG. 3 is a response curve of the low pass filter of the main G sensor 11. More specifically, it indicates a step response curve of the secondary low pass filter with the cut off frequency of 175 Hz. In other words, the response curve indicated by the bold line in FIG. 3 shows the response curve when the vehicle collision is most intense. FIG. 3 is drawn such that the maximum value of the gain of the response curve indicated by the bold line is 1. Also, sampling time n=0 corresponds to the moment of the vehicle collision.

The thinner line in FIG. 3 shows the gain change amount at sampling T1 (0.5 msec) of the response curve indicated by the bold line. In other words, according to FIG. 3, the change amount behaves such that the gain change amount at sampling T1 on the response curve is equal to or less than approximately 30% of the maximum value of the response curve gain. That is, the normal/abnormal determination threshold value ThDG can be set at approximately 30% of the maximum gainon the response curve. Note that the gain of the output value change amount DG(n) is equal to the difference between the gain of the main acceleration signal output value G(n) at time n, and the gain of the main acceleration signal output value G(n−1) at time n−1.

(Collision Determination Processing)

Next, detailed description is given regarding the collision determination processing. As described above, the collision determination unit 128 performs the collision determination processing based on the main acceleration signal and the satellite acceleration signal. To illustrate an example of the collision determination processing, explanation is given regarding a case in which segment integration is performed. Namely, it is determined whether the vehicle has collided based on a segment integral value calculated by segment integration that is performed based on the main acceleration signal and the satellite acceleration signal (segment integrating means), then the airbag release signal is output in the case where it is judged that the vehicle has collided (release signal outputting means). The segment integration generally uses all of the input main acceleration signals and satellite acceleration signals; however, segment integration in the present embodiment uses the appropriate acceleration signals obtained by performing the above-mentioned normal/abnormal determination processing.

Figure 4:
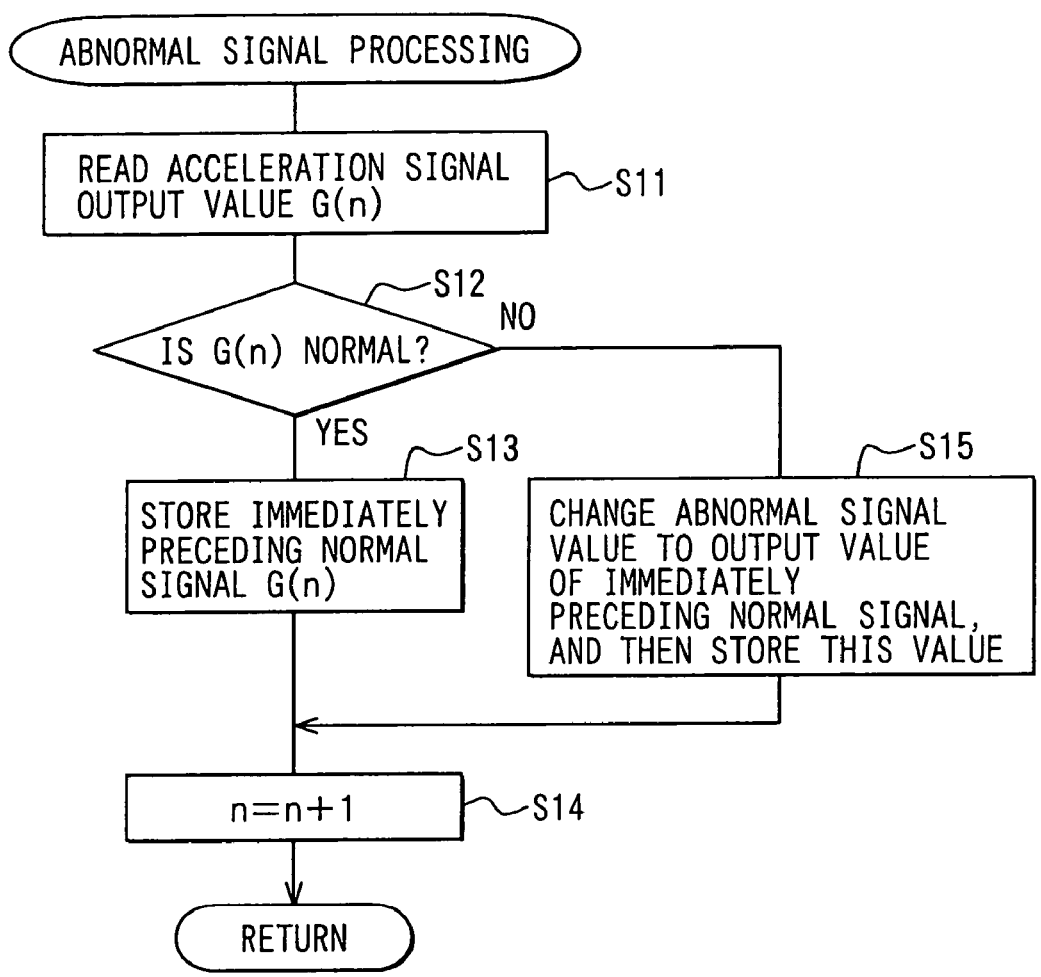
FIG. 4 is a flowchart of abnormal signal processing.

First, abnormal signal processing is performed on the acceleration signal that was determined to be an abnormal signal by the normal/abnormal determination processing, and an abnormal signal processing signal is generated. The abnormal signal processing is explained with reference to FIG. 4. FIG. 4 shows a flowchart of the abnormal signal processing. First, the acceleration signal G(n) at a sampling time n after the normal/abnormal determination processing was performed is read (step S11). Then, in the case where the acceleration signal G(n) that was read is a normal signal (step S12: YES), the output value of that acceleration signal G(n) is stored (immediately preceding normal signal storing means) (step S13). Here, the output value of the acceleration signal G(n) that was stored becomes the output value of the immediately preceding normal signal, which is the normal signal that came immediately before the abnormal signal. Next, "1" is added to the sampling time n and the procedure returns (step S14). In other words, the procedure returns to step S11 and performs processing to read the acceleration signal G(n) at the new time (n+1) (i.e., acceleration signal G(n+1) is read).

On the other hand, in the case where the acceleration signal G(n) that was read is an abnormal signal (step S12: NO), the value of the abnormal signal is changed to the stored output value of the immediately preceding normal signal, and then this value is stored (step S15). In other words, when the abnormal signal processing is performed on the abnormal signal, the output value of the abnormal signal processing signal is set using the output value of the immediately preceding normal signal. Next, "1" is added to the sampling time n and the procedure returns (step S14). Then, the collision determination processing is performed using the segment integration value obtained by performing segment integration on the output values of the normal signals and the values of the abnormal signal processing signals occurring within a predetermined duration of time.

In the abnormal signal processing described above, the value of the abnormal signal processing signal is set using the output value of the immediately preceding normal signal. However, the present invention is not limited to this configuration. For example, the value of the abnormal signal processing signal may also be set to 0. Alternatively, it is also possible to perform the segment integration using only the normal signals, without performing the abnormal signal processing. Further, the collision determination processing was explained using segment integration as an example, but the present invention is not limited to this configuration.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A loading system for a vehicle passenger protection device of a vehicle, the system comprising:
    an acceleration sensor, wherein the acceleration sensor detects vehicle acceleration;
    means for determining a collision based on an output signal from the acceleration sensor and a collision determination threshold value, and outputting an airbag release signal, in a case where the collision determination means determines that the vehicle has collided;
    means for igniting a squib by electrical power from an electrical source to release and load an airbag, in a case where the airbag release signal has been output; and means for judging whether the output signal from the acceleration sensor is a normal signal or an abnormal signal based on a normal or abnormal threshold value, wherein
the collision determination means determines whether or not the vehicle has collided based only on the normal signal.

2. A loading system for a vehicle passenger protection device of a vehicle, the system comprising:
an acceleration sensor for detecting acceleration of a vehicle;
collision determination means for determining whether or not the vehicle has collided based on an output signal from the acceleration sensor and a collision determination threshold value, and outputting an airbag release signal in a case where the collision determination means determines that the vehicle has collided;
loading means for igniting a squib by means of electrical power from a battery or a backup electric source to release and load an airbag, in a case where the airbag release signal has been output;
judgment means for judging whether the output signal from the acceleration sensor is a normal signal or an abnormal signal based on a normal or abnormal threshold value; and
abnormal signal processing means for performing specific abnormal signal processing on the abnormal signal to generate an abnormal signal processing signal, wherein
the collision determination means determines whether or not the vehicle has collided based on the normal signal and the abnormal signal processing signal.

3. A loading system for a vehicle passenger protection device of a vehicle, the system comprising:
an acceleration sensor for detecting acceleration of a vehicle;
collision determination means for determining whether or not the vehicle has collided based on an output signal from the acceleration sensor, and outputting an airbag release signal in a case where the collision determination means determines that the vehicle has collided;
loading means for igniting a squib by means of electrical power from a battery or a backup electric source to release and load an airbag, in a case where the airbag release signal has been output;
judgment means for judging whether the output signal from the acceleration sensor is a normal signal or an abnormal signal; and
abnormal signal processing means for performing specific abnormal signal processing on the abnormal signal to generate an abnormal signal processing signal, wherein the collision determination means determines whether or not the vehicle has collided based on the normal signal and the abnormal signal processing signal, wherein the abnormal signal processing means further comprises:
immediately preceding normal signal storing means for storing an immediately preceding normal signal output value, which is an output value of the normal signal immediately preceding the abnormal signal; and
abnormal signal processing signal setting means for setting the value of the abnormal signal processing signal to the immediately preceding normal signal output value.

4. A loading system for a vehicle passenger protection device of a vehicle, the system comprising:
an acceleration sensor for detecting acceleration of a vehicle;
collision determination means for determining whether or not the vehicle has collided based on an output signal from the acceleration sensor, and outputting an airbag release signal in a case where the collision determination means determines that the vehicle has collided;
loading means for igniting a squib by means of electrical power from a battery or a backup electric source to release and load an airbag, in a case where the airbag release signal has been output;
judgment means for judging whether the output signal from the acceleration sensor is a normal signal or an abnormal signal; and
abnormal signal processing means for performing specific abnormal signal processing on the abnormal signal to generate an abnormal signal processing signal, wherein
the collision determination means determines whether or not the vehicle has collided based on the normal signal and the abnormal signal processing signal,
wherein the abnormal signal processing means sets the value of the abnormal signal processing signal to zero.

5. A loading system for a vehicle passenger protection device of a vehicle, the system comprising:
an acceleration sensor for detecting acceleration of a vehicle;
collision determination means for determining whether or not the vehicle has collided based on an output signal from the acceleration sensor, and outputting an airbag release signal in a case where the collision determination means determines that the vehicle has collided;
loading means for igniting a squib by means of electrical power from a battery or a backup electric source to release and load an airbag, in a case where the airbag release signal has been output;
judgment means for judging whether the output signal from the acceleration sensor is a normal signal or an abnormal signal; and
abnormal signal processing means for performing specific abnormal signal processing on the abnormal signal to generate an abnormal signal processing signal, wherein the collision determination means determines whether or not the vehicle has collided based on the normal signal and the abnormal signal processing signal,
wherein the normal/abnormal judgment means comprises:
change amount calculating means for calculating an output value change amount, being an amount that an output value of the output signal from the acceleration sensor changes, during a predetermined period of time; and
comparative judging means for comparing the output value change amount and a normal/abnormal determination threshold value, and judging that the output signal from the acceleration sensor is abnormal in a case where the output value change amount exceeds the normal/abnormal determination threshold value.

6. The loading system for a vehicle passenger protection device according to claim 5, where the normal/abnormal determination threshold value is a value equal to a specific proportion of the maximum value of the output signal from the acceleration sensor.

7. The loading system for a vehicle passenger protection device according to claim 1, wherein the acceleration sensor is a satellite sensor.

8. A method of controlling a vehicle-mounted device, the method comprising:
receiving an output signal of a sensor provided in a vehicle as a satellite sensor;
sampling the output signal of the sensor periodically;

calculating a change in the sampled output signal;

determining whether the output signal of the sensor is normal or abnormal by using the calculated change; and driving the vehicle-mounted device based on the sampled output signal, by canceling or processing the abnormal sampled output signal when the output signal is determined as abnormal.

9. The method of controlling a vehicle-mounted device according to claim 8, wherein:

the sensor is an acceleration sensor;

the vehicle-mounted device is an airbag;

the determining uses a predetermined normal/abnormal threshold value in determining whether the output signal is normal or abnormal; and the driving uses a predetermined collision determination threshold value to determine a vehicle collision and to drive the airbag.

10. The method of controlling a vehicle-mounted device according to claim 9, wherein:

the predetermined normal/abnormal threshold value is set to about 30% of a maximum value of the output signal, which the sensor normally produces.

11. The loading system for a vehicle passenger protection device according to claim 2, wherein the acceleration sensor is a satellite sensor.

12. The loading system for a vehicle passenger protection device according to claim 3, wherein the acceleration sensor is a satellite sensor.

13. The loading system for a vehicle passenger protection device according to claim 4, wherein the acceleration sensor is a satellite sensor.

14. The loading system for a vehicle passenger protection device according to claim 5, wherein the acceleration sensor is a satellite sensor.

15. The loading system for a vehicle passenger protection device according to claim 6, wherein the acceleration sensor is a satellite sensor.

* * * * *